July 23, 1935.    F. OLDROYD    2,009,147
LOADING AND EXCAVATING MACHINE
Filed March 31, 1934
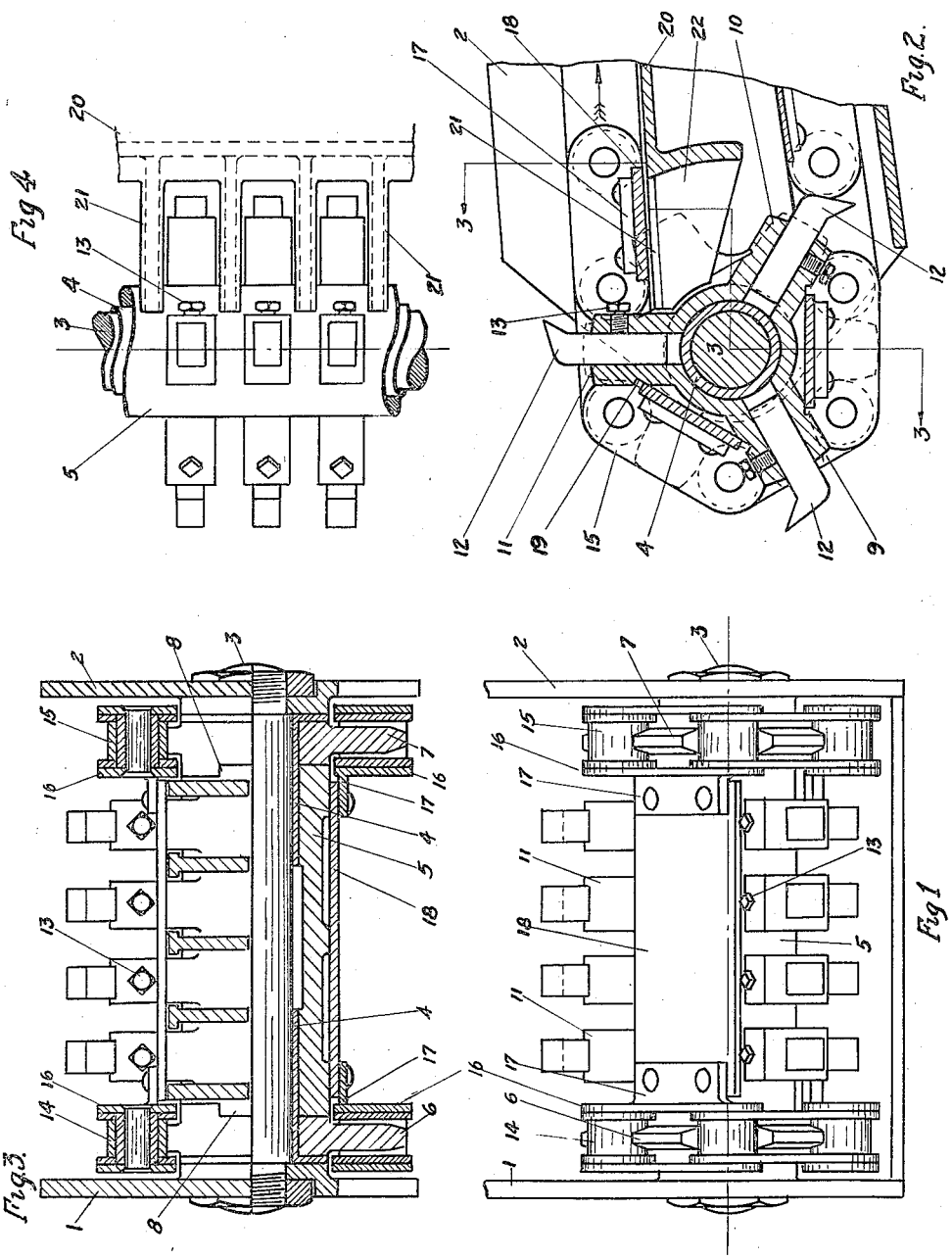
INVENTOR.
Fred Oldroyd
BY
Arthur H. Ewald,
ATTORNEY.

Patented July 23, 1935

2,009,147

UNITED STATES PATENT OFFICE 2,009,147

LOADING AND EXCAVATING MACHINE

Fred Oldroyd, Cincinnati, Ohio, assignor to Esther Oldroyd, Cincinnati, Ohio

Application March 31, 1934, Serial No. 718,413

14 Claims. (Cl. 198—9)

The present invention relates to loading and excavating machines of the type used in mining coal and other similar services.

The principal object of my invention is to provide in a machine of the type mentioned having a rotary cutter head a belt or chain for the operation of said cutter head, said belt being provided with means whereby it is adapted to receive the material excavated or mined and to deposit it in the trucks or other vehicles into which it is to be loaded. It will thus be seen that in my improved device there is provided a loading and excavating machine of comparatively simple and inexpensive construction, as well as one of improved efficiency and speed in operation.

Other objects of my invention will appear from the following detailed description thereof.

In the drawing:

Figure 1 is an end elevation of the pertinent parts of a loading and excavating machine constructed in accordance with this invention.

Figure 2 is a section on a line transverse to the axis of the cutter head.

Figure 3 is a section on line 3—3 of Figure 2.

Figure 4 is a plan view of a portion of the cutter head and table.

Numerals 1 and 2 indicate side walls or plates between which the shaft 3 for the rotary cutter head is mounted. Mounted on the shaft 3 is a bearing sleeve 4. Rotatably mounted on the bearing 4 is the cutter head 5. Also rotatable on the sleeve 4 are sprocket wheels 6 and 7 located at the respective ends of the shaft and notched as shown at 8 so as to engage with said head. Arranged in rows on the head are cutter arms 9, 10 and 11. Mounted in the arms 9, 10 and 11 of the cutter head are cutters or picks 12, the same being secured therein by means of set screws 13. Sprocket chains 14 and 15 are arranged to ride over and to drive the sprockets 6 and 7. The inner plates 16 of the links of sprocket chains 14 and 15 are provided with lugs 17, carrier plates 18 being secured to respective pairs of lugs by means of bolts or rivets as shown. The plates 18 are of a width substantially to span the intervals between adjacent pairs of arms 9, 10 and 11 of the cutter head, the said arms being notched as shown at 19 in Figure 2 to provide edge bearings or rests for the plates during operation as hereinafter set forth. Mounted between the walls 1 and 2 beyond the arc of rotation of the picks 12 is a table 20 having fingers 21 supported by webs 22 carried by the underside of the table. The fingers 21 extend forwardly between the units of the rows of cutter arms 9, 10 and 11 substantially to the head.

The operation of the device will, it is thought, be apparent from the foregoing description. It should be noted, however, that when the cutter head is driven by means of the sprocket chains 14 and 15 through the sprockets 6 and 7, the carrier plates 18 move with the chains in the direction of the arrow in Figure 2. As material is dislodged by the cutter picks 12, it is received by the carrier plates which move with the cutter head between the rows of cutter carrying arms thereof. After leaving the cutter head the plates 18 carry the material over fingers 21 and table 20 as will be readily understood and deposit same into the truck or other vehicle into which it is to be loaded. The width of the carrier plates 18 and the intervals between adjacent pairs of carrier plates are such that as the cutter head rotates and the plates consecutively move away therefrom, said plates will bridge the interval between the head and the table 20, and as the picks descend they will just clear the table and the advancing plate moving between the fingers 21, which give added support to the plate.

While I have shown in the drawing and hereinabove described my improved device as being driven by means of sprocket wheels located at the respective ends of the cutter head and operatively secured thereto, it will be understood that other means of operation, as for instance the driving of the cutter by means of the plates 18 themselves contacting with the arms 11 is within contemplation of this invention as defined in the appended claims.

Having thus fully described my invention what I claim as new and desire to secure by Letters Patent is:

1. A device of the character specified comprising a rotary head, cutters carried by said head and arranged in longitudinal alignment thereon, means for driving said head, and carrier elements carried by said driving means and arranged to travel between and to bear upon the lines of cutters.

2. A device of the character specified comprising a rotary head, cutters carried by said head and arranged in longitudinal alignment thereon, a table rigidly supported beyond the arc of rotation of said cutters, means for driving said head, and carrier elements carried by said driving means and arranged to travel between and to bear upon the lines of said cutters and over said table, said carrier elements being of a width to bridge the gap between said head and table.

3. A device of the character specified comprising a rotary head, cutter arms arranged in lines on said head, cutters removably secured in said arms, means for driving said head, and carrier elements carried by said driving means and arranged to travel between and to bear upon the lines of cutter arms.

4. A device of the character specified comprising a rotary head, cutter arms arranged in lines on said head, cutters removably secured in said arms, a table rigidly supported beyond the arc of rotation of said cutters, means for driving said head, and carrier elements carried by said driving means and arranged to travel between and to bear upon the lines of cutter arms and over said table, said carrier elements being of a width to bridge the gap between said head and table.

5. A device of the character specified comprising a rotary head, cutters carried by said head and arranged in longitudinal alignment thereon, sprocket wheels mounted coaxially with said head and operatively secured thereto, sprocket chains for driving said wheels and head, and carrier plates secured to opposite links of the respective belts and arranged to travel between and to bear upon the lines of cutters.

6. A device of the character specified comprising a rotary head, cutters carried by said head and arranged in longitudinal alignment thereon, a table rigidly supported beyond the arc of rotation of said cutters, sprocket wheels mounted coaxially with said head and operatively secured thereto, sprocket chains for driving said wheels and head and carrier plates secured to opposite links of the respective belts and arranged to travel between and to bear upon the lines of cutters and over said table, said carrier plates being of a width to bridge the gap between said head and table.

7. A device of the character specified comprising a rotary head, cutter arms arranged in lines on said head, cutters removably secured in said arms, sprocket wheels mounted coaxially with said head and operatively secured thereto, sprocket chains for driving said wheels and head, and carrier plates secured to opposite links of the respective belts and arranged to travel between and to bear upon the lines of cutter arms.

8. A device of the character specified comprising a rotary head, cutter arms arranged in lines on said head, cutters removably secured in said arms, a table rigidly supported beyond the arc of rotation of said cutters, sprocket wheels mounted coaxially with said head and operatively secured thereto, sprocket chains for driving said wheels and head, and carrier plates secured to opposite links of the respective chains and arranged to travel between and to bear upon the lines of cutter arms and over said table, said carrier plates being of a width to bridge the gap between said head and table.

9. A device of the character specified comprising a shaft, a cutter head rotatably mounted on said shaft, cutters carried by said head and arranged in longitudinal alignment thereon, means for driving said head, and carrier elements carried by said driving means and arranged to travel between and to bear upon the lines of cutters.

10. A device of the character specified comprising a shaft, a cutter head rotatably mounted on said shaft, cutters carried by said head and arranged in longitudinal alignment thereon, a table rigidly supported beyond the arc of rotation of said cutters, means for driving said head and carrier elements carried by said driving means and arranged to travel between and to bear upon the lines of cutters and over said table, said carrier elements being of a width to bridge the gap between said head and table.

11. A device of the character specified comprising a rotary head, cutters carried by said head and arranged in longitudinal alignment thereon, a table rigidly supported beyond the arc of rotation of said cutters, means for driving said head, carrier elements carried by said driving means and arranged to travel between and to bear upon the lines of said cutters and over said table, said carrier elements being of a width to bridge the gap between said head and table, and fingers carried by said table and extending forwardly therefrom between said cutters.

12. A device of the character specified comprising a rotary head, cutter arms arranged in lines on said head, cutters removably secured in said arms, a table rigidly supported beyond the arc of rotation of said cutters, means for driving said head, carrier elements carried by said driving means and arranged to travel between and to bear upon the lines of cutter arms and over said table, said carrier elements being of a width to bridge the gap between said head and table, and fingers carried by said table and extending forwardly therefrom between said cutter arms.

13. A device of the character specified comprising a rotary head, cutters carried by said head and arranged in longitudinal alignment thereon, a table rigidly supported beyond the arc of rotation of said cutters, sprocket wheels mounted coaxially with said head and operatively secured thereto, sprocket chains for driving said wheels and head, carrier plates secured to opposite links of the respective chains and arranged to travel between and to bear upon the lines of cutters and over said table, said carrier plates being of a width to bridge the gap between said head and table, and fingers carried by said table and extending forwardly therefrom between said cutters.

14. A device of the character specified comprising a rotary head, cutter arms arranged in lines on said head, cutters removably secured in said arms, a table rigidly supported beyond the arc of rotation of said cutters, sprocket wheels mounted coaxially with said head and operatively secured thereto, sprocket chains for driving said wheels and head, carrier plates secured to opposite links of the respective chains and arranged to travel between and to bear upon the lines of cutter arms and over said table, said carrier plates being of a width to bridge the gap between said head and table, and fingers carried by said table and extending forwardly therefrom between said cutter arms.

FRED OLDROYD.